United States Patent [19]

Burzdak et al.

[11] Patent Number: 4,850,133
[45] Date of Patent: Jul. 25, 1989

[54] SPRING LOADED ECOLOGY BUG CATCHER

[76] Inventors: Louis Burzdak, 2619 Sepulveda, No. 8; Timothy D. Edwards, 2617 Sepulveda, No. 12, both of Los Angeles, Calif. 90064

[21] Appl. No.: 291,507

[22] Filed: Dec. 29, 1988

[51] Int. Cl.⁴ .............................................. A01M 3/04
[52] U.S. Cl. ........................................ 43/136; 43/137; 294/19.1; 294/104
[58] Field of Search ................... 43/65, 110, 116, 134, 43/135, 136, 137; 294/19.1, 104

[56] References Cited

U.S. PATENT DOCUMENTS

| | | | |
|---|---|---|---|
| 1,750,163 | 3/1930 | Disney | 43/110 |
| 3,191,339 | 6/1965 | Dougherty | 43/137 |
| 4,039,216 | 8/1977 | Soos | 294/19.1 |
| 4,163,340 | 8/1979 | Ver Der Merwe | 43/134 |
| 4,174,586 | 11/1979 | Burzdak | 43/134 |
| 4,450,649 | 5/1984 | Dunwoody | 43/136 |
| 4,575,143 | 3/1986 | Nast | 294/19.1 |

*Primary Examiner*—Nicholas P. Godici
*Assistant Examiner*—Michael William Starkweather
*Attorney, Agent, or Firm*—W. Edward Johansen

[57] ABSTRACT

An ecology bug catcher for efficiently trapping a bug without killing it includes a hollow tube with a first end and a second end, a catching mechanism for catching a bug, an ejecting mechanism and a triggering mechanism. The catching mechanism has a first position in which it is resiliently biased so that it is normally closed and a second position in which it is held open. The catching mechanism is slidably coupled into the hollow tube at the first end so that the hollow tube holds it in the second position until the catching mechanism is ejected from the hollow tube and returns to the first position. The ejecting mechanism ejects the catching mechanism from the hollow tube. The triggering mechanism releases the catching mechanism. The ejecting mechanism includes a plug, a spring and a connector and ejects the catching mechanism in order to catch a bug. The plug is mechanically coupled to the hollow tube adjacent to the second end. The spring with a first end and a second end is insertedly coupled into the hollow tube. The first end of the spring is mechanically coupled to the plug. The connector with a first end and a second end connects the first end of the spring to the plug and the second end of the spring to the catching mechanism. The connector is insertedly coupled into the hollow tube. A stopping mechanism stops the connector from being completely ejected from the hollow tube.

4 Claims, 2 Drawing Sheets

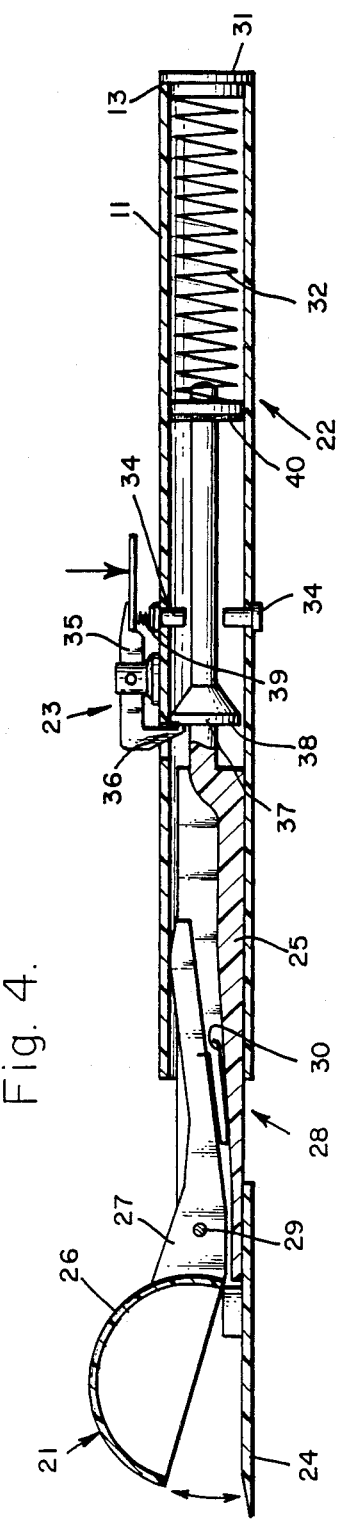
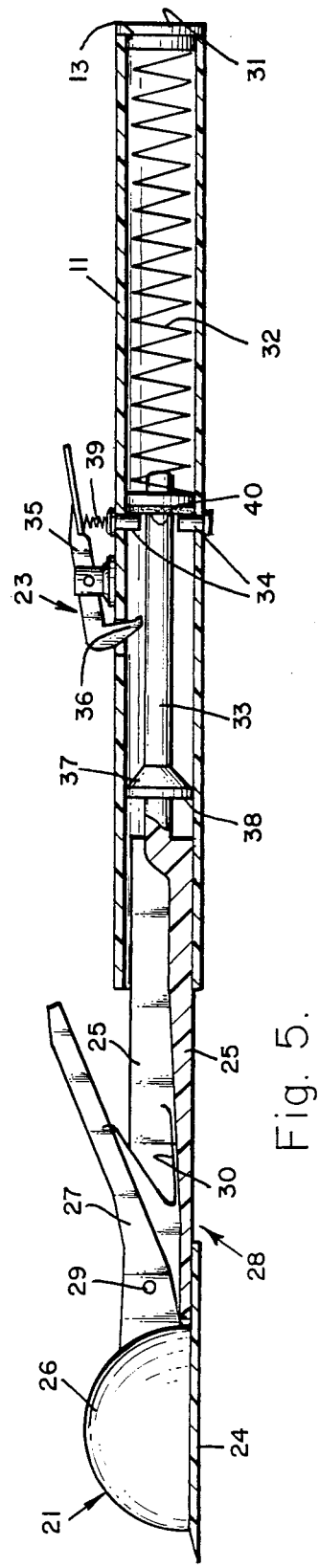

SPRING LOADED ECOLOGY BUG CATCHER

BACKGROUND OF INVENTION

1. Field of the Invention

The invention relates to insect catching devices and more particularly to an ecology bug catcher which efficiently traps a bug without killing it.

2. Description of the Prior Art

U.S. Pat. No. 4,174,586, entitled Bug Catcher, issued to Louis Burzdak on Nov. 20, 1979, teaches a bug catcher includes a platform member and a semispherical member which is mechanically adapted to be enclosed by the platform member. The bug catcher also includes a first elongated member which is mechanically coupled to the platform member at one end and a second elongated member which is mechanically coupled to the semispherical member at one end. The bug catcher further includes a hinge which pivotally couples the ends of the two elongated members which are oppositely disposed to the ends thereof to the platform to the platform member and the semispherical member. The semispherical member is generally formed from a clear plastic in order to allow the person to view the entrapped insect. The hinge includes a spring which is mechanically coupled to the two elongated members in order to spring bias them so that they will separate which the person releases them. The platform member may be a solid rectangular member or a rectangular piece of wire screen mesh which is adapted so that the person may trap an insect in the sand outdoors. The bug catcher enables a person to capture an insect without killing or injuring it in order that he may set the insect free outdoors.

U.S. Pat. No. 4,631,858, entitled Bug Catcher, issued to Normal Kahle on Dec. 30, 1986, teaches a bug catcher which includes a tube having an open front end and a piston therein. The piston is moved manually to a forward cocked position adjacent to the open end of the tube, against the action of a tension spring. A closure flapper is hinged in the tube adjacent to the open end of the tube and is spring biased to the closed position. In operation, tbe open end of the tube is held near the insect, with the piston in cocked position, and the piston is then released, which is thereupon drawn back by the tension spring. This movement of the piston produces a vacuum in the tube, this action opening the closure flapper, and drawing in the insect, after which the closure flapper is move closed position by the spring. The bug catcher catches insects, such as bugs, flies, ants, and similar small insects. The bug catcher effectively lifts the insects and draws them into the bug catcher alive. The bug catcher serves as a trap and eliminates killing the insects as by swatting them and the consequent smearing effect. The bug catcher is simple in construction and simple and effective in its operation.

U.S. Pat. No. 4,052,811, entitled Insect Catching Device issued to Esther B. Shuster and Jacob Shuster on Oct. 11, 1977, teaches an insect catching device which inclues a rigid body, a resilient support projecting from the rigid body, a flexible sheet of material having a tacky surface which is anchored to the resilient support and the rigid body in overlying support so that a portion of the tacky surface is exposed in order to catch insects. These insects are killed when they are removed from this device.

U.S. Pat. No. 3,996,690, entitled Combination Insect Trap and Swatter Device, issued to Ronald W. Ridings on Dec. 14, 1976, teaches a combination insect trap and swatter which includes a walled receptacle with an entrance for insects, a swatter apparatus, and a flexible arm which is mechanically coupled to the walled receptacle so that it can effect the closure of the swatter apparatus against the walled member's top wall thereby killing the entrapped insects.

U.S. Pat. No. 1,099,342, entitled Fly Catcher, issued to Bert O. Copenhaver on June 9, 1914 teaches a fly catcher which includes two members which are mechanically couple together by a coupling apparatus which pivotally couples the two members.

U.S. Pat. No. 5,726, entitled Fly-Trap, issued to Wilson Shreve on Aug. 22, 1848, teaches a platform member and a semicylindrical member which are pivotally coupled together so that the semicylindrical member may closed in order to trap insect within. This device is a stationary device and is not very useful in collecting insects.

U.S. Pat. No. 1,664,762, entitled Insect Destroyer, issued to Herman E. Voss on Apr. 3, 1928, teaches an insect destroyer which includes two elongated, rectangular platform members which are hinged together so that they may be brought together in order to kill entrapped insects.

U.S. Pat. No. 210,163, entitled Improvement in Potato-Bug Catcher, issued to Conrad P. Steinmetz on Nov. 19, 1878, teaches a potato bug catcher which has two concave members that match and fit together in order to be brought together so that they can crush a potato bug therein.

All of the above patents describe devices which are used to capture and kill insects. Many individuals do not wish to kill insects, but merely to remove them from a particular premise. Other individuals wish only to capture insects in order to study them and free them soon thereafter. Many devices for capturing insects are complicated and expensive. There are not inexpensive and easy to use devices for capturing insects for viewing and studying without injuring the insects. There also no devices for capturing insects which are hiding under a layer of sand that may be used efficiently.

SUMMARY OF INVENTION

In view of the foregoing factors and conditions which are characteristic of the prior art it is the primary object of the present invention to provide an ecology bug catcher which efficiently traps an insect without killing it.

In accordance with the present invention an embodiment of an ecology bug catcher for efficiently trapping a but without killing is described. The ecology but catcher includes a hollow tube with a first end and a second end, a catching mechanism for catching a but, an ejecting mechanism and a triggering mechanism. The catching mechanism has a first position in which it is resiliently biased so that it is normally closed and a second position in which it is held open. The catching mechanism is slidably coupled into the hollow tube at the first end so that the hollow tube holds it in the second position until the catching mechanism is ejected from the hollow tube and returns to the first position. The ejecting mechanism ejects the catching mechanism from the hollow tube. The triggering mechanism releases the catching mechanism. The ejecting mechanism includes a plug, a spring and a connector and ejects the catching mechanism in order to catch a bug. The plug is mechanically coupled to the hollow tube adjacent to the second end. The spring with a first end and a second end is insertably coupled into the hollow tube. The first end of the spring is mechanically coupled to the plug. The connector with a first end and a second end connects the first end of the spring to the plug and the second end of the spring to the catching mechanism. The connector is insertedly coupled into the hollow tube. A stopping mechanism stops the connector from being completely ejected from the hollow tube.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 4 is a side elevational view in cross-section of the ecology bug catcher of FIG. 1 along the line 4—4 of FIG. 2 with the catching mechanism in the open position.

FIG. 5 is a side elevational view in cross-section of the ecology bug catcher of FIG. 1 along the line 5—5 of FIG. 2 with the catching mechanism in the normally closed position.

DESCRIPTION OF THE PREFERRED EMBODIMENT

Figure 1:
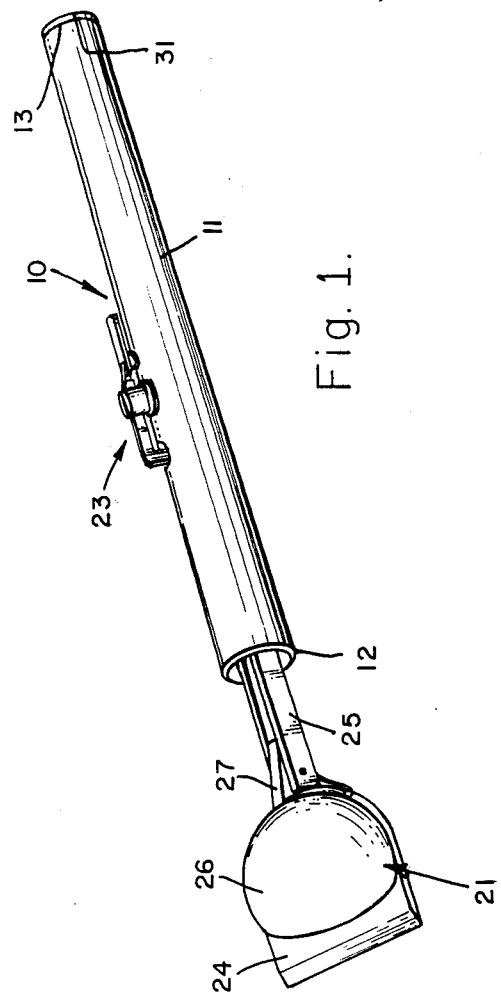
FIG. 1 is a perspective view of an ecology bug catcher which has been constructed in accordance with the principles of the present invention.
Figure 2:
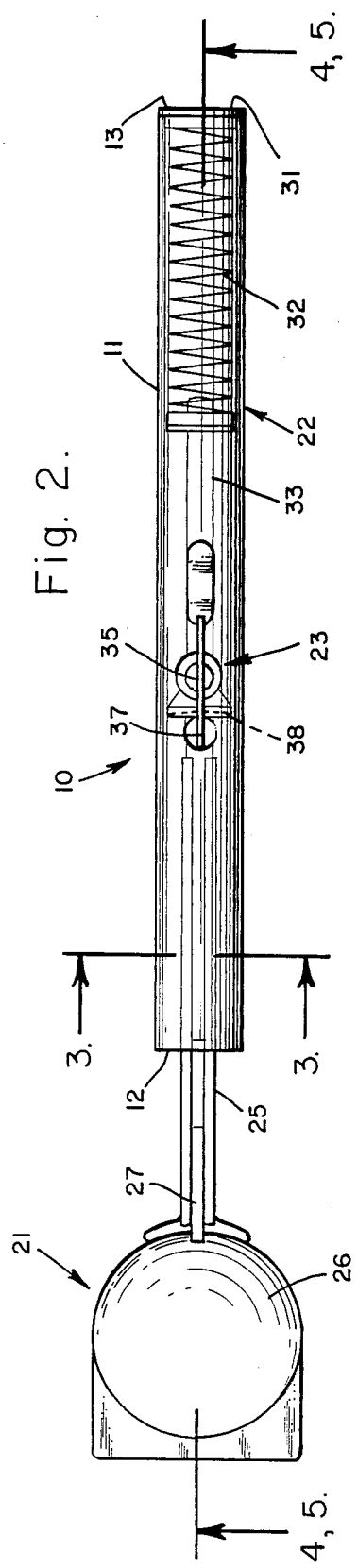
FIG. 2 is a top plan view of the ecology bug catcher of FIG. 1 which has a catching mechanism for catching a bug.

In order to best understand the present invention it is necessary to refer to the following description of its preferred embodiment in conjunction with the accompanying drawing. Referring to FIG. 1 in conjunction with FIG. 2 an ecology bug catcher 10 for efficiently trapping a bug without killing it includes a hollow tube 11 with a first end 12 and a second end 13, a catching mechanism 21 for catching a but, an ejecting mechanism 22 and a triggering mechanism 23. The catching mechanism 21 has a first position in which it is resiliently biased so that it is normally closed and a second position in which it is held open. The catching mechanism 21 is slidably coupled into the hollow tube 21 adjacent to the first end 12 so that the hollow tube 11 holds it in the second position until the catching mechanism 21 is ejected from the hollow tube 11 and returns to the first position. The ejecting mechanism 22 ejects the catching mechanism 21 from the hollow tube 11. The triggering mechanism 23 releases the catching mechanism 21.

Figure 3:
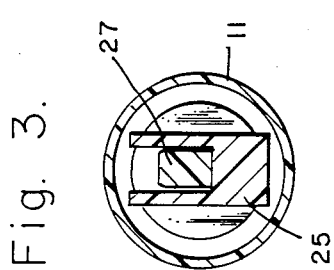
FIG. 3 is a front elevational view in cross-section of the ecology bug catcher of FIG. 1 along the line 3—3 of FIG. 2.

Referring to FIG. 3 in conjunction with FIG. 4 the catching mechanism includes a platform member 24, a first elongated member 25, a semispherical member 26, a second elongated member 27 and a shielding member 28. The first elongated member 25 is mechanically coupled to the platform member 24 at one end. The semispherical member 26 is adapted to be mechanically enclosed by the platform member 24. The shielding member 28 is an upwardly disposed wall adjacent to the end opposite the angularly cut end of the platform member 24 thereon whereby a stop for the insert is provided so that said ecology bug catcher's quick scooping action will allow the insect to avoid being entrapped between the platform member 24 and the semispherical member 26. The second elongated member 27 is mechanically coupled to the semispherical member 26 at a first end and which is pivotally coupled to the first elongated member at said first end so that the semispherical member 26 may be mechanically enclosed by the platform member 24. A coupling mechanism 28 resiliently couples the first elongated member 25 to the second elongated member 27. The coupling mechanism 28 includes a pivot pin 29 and a flat compression spring 30 in order to bias the first and second elongated members 25 and 27 so that the catching mechanism 21 is normally closed in the first position. The semispherical member 26 is generally formed from a clear plastic material in order to allow a person to view an entrapped bug.

Referring to FIG. 5 in conjunction with FIG. 4 the ejecting mechanism 22 includes a plug 31, a spring 32 and a connector 33. The plug 31 is mechanically coupled to the hollow tube 11 adjacent to the second end 13. The spring 32 with a first end and a second end is insertedly coupled into the hollow tube 11. The first end of the spring 32 is mechanically coupled to the plug 31. The connector 33 with a first end and a second end connects the first end of the spring 32 to the plug 31 and the second end of the spring 32 to the catching mechanism 21. The connector 33 is insertedly coupled into the hollow tube. A stopping mechanisms 34 stops the connector 33 from being completely ejected from the hollow tube. The ejecting mechanism 22 ejects the catching mechanism 21 in order to catch a bug.

Also referring to FIG. 5 in conjunction with FIG. 4 the triggering mechanism 23 includes a lever arm 35 with a hooked end 36 and a trigger latch 37 which has a latching cavity 38 and which is mounted on the connector 33. The lever arm 35 is pivotally mounted to the hollow tube 11 and a spring 39 resiliently biases the lever arm 35. A shocking absorbing material 40 may be affixed to the connector 40.

From the foregoing it can be seen that an ecology bug catcher has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. An ecology bug catcher for efficiently trapping a bug without killing it, said ecology bug catcher comprising:
   a. a hollow tube which has a first end and a second end;
   b. catching means for catching a bug, said catching means having a first position in which said catching means is resiliently biased so that it is normally closed and a second position in which said catching means is held open, said catching means being slidably coupled into said hollow tube at said first end so that said hollow tube holds said catching means in said second position until said catching means is ejected from said hollow tube whereby said catching means returns to said first position;
   c. ejecting means for ejecting said catching means from said hollow tube; and d. triggering means for releasing said catching means whereby said ejecting means ejects said catching means in order to catch a bug.

2. An ecology bug catcher according to claim 1 wherein said ejecting means comprises:
   a. a plug which is mechanically coupled to said hollow tube adjacent to said second end;
   b. a spring which has a first end and a second end and which is insertedly coupled into said hollow tube, said first end of said spring being mechanically coupled to said plug;
   c. connecting means for connecting said first end of said spring to said plug and said second end of said spring to said catching means, said connecting means having a first end and a second end and being insertedly coupled into said hollow tube; and
   d. stopping means for stopping said connecting means from being completely ejected from said hollow tube.

3. An ecology bug catcher according to claim 2 wherein said catching means comprises:
   a. a platform member;
   b. a first elongated member which is mechanically coupled to said platform member at one end;
   c. a semispherical member which is adapted to be mechanically enclosed by said platform member;
   d. a shielding member which is an upwardly disposed wall adjacent to the end opposite the angularly cut end of said platform member thereon whereby a stop for the insect is provided so that said ecology bug catcher's quick scooping action will allow the insect to avoid being entrapped between said platform member and said semispherical member;
   e. a second elongated member which is mechanically coupled to said semispherical member at a first end and which is pivotally coupled to said first elongated member at said first end so that said semispherical member may be mechanically enclosed by said platform member; and
   f. resiliently coupling means for resiliently coupling said first elongated member to said second elongated member whereby said resiliently coupling means biases said first and second elongated members so that said catching means is normally closed in said position.

4. An ecology bug catcher according to claim 3 wherein said semispherical member is generally formed from a clear plastic material in order to allow a person to view an entrapped bug.

* * * * *